(No Model.)

F. A. McKEONE.
FILTER PRESS.

No. 550,639. Patented Dec. 3, 1895.

WITNESSES:
Lester L. Allen
S. E. Ball

INVENTOR
F. A. McKeone
BY
R. J. McCarty
ATTORNEY.

United States Patent Office.

FRANK A. McKEONE, OF DAYTON, OHIO, ASSIGNOR TO THE STILWELL-BIERCE & SMITH-VAILE COMPANY, OF SAME PLACE.

FILTER-PRESS.

SPECIFICATION forming part of Letters Patent No. 550,639, dated December 3, 1895.

Application filed May 31, 1895. Serial No. 551,062. (No model.)

*To all whom it may concern:*

Be it known that I, FRANK A. McKEONE, of Dayton, county of Montgomery, State of Ohio, have invented a new and useful Improvement in Filter-Presses for Absorbing Moisture from Solids for the Purpose of Hydrating; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in a machine and a method for absorbing the moisture from solids which have been formed into cakes in the chambers of a filter-press after their separation from a liquid or hydrate form. The previous process of filtration, it will be understood, separates said solid from the liquid with which it has been associated, leaving said liquid to pass off through drainage, and the solid matter is formed into cakes in the chambers of the filter-press. In this form there is still an undesirable amount of moisture remaining in the substance, and the object of my invention is to absorb this moisture while the cakes are still in the press. Without confining the process and mechanical means to the treatment of any particular class of matter that may be thus formed by filtration I may mention white lead, the solids that have been separated from brewery slop or refuse by filtration, and many other mineral and chemical products that have been successfully treated by this process.

The accompanying drawings represent a form of filter-press that is adapted to the purposes of the invention.

Figure 1:
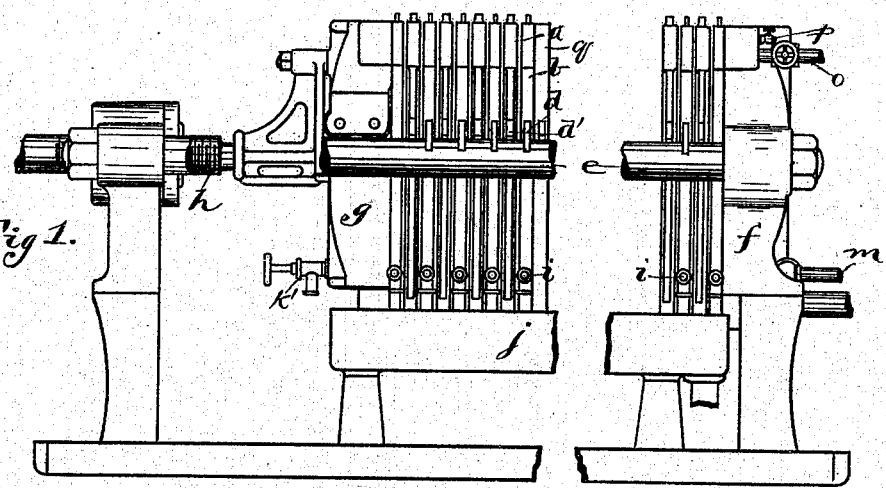
Figure 2:
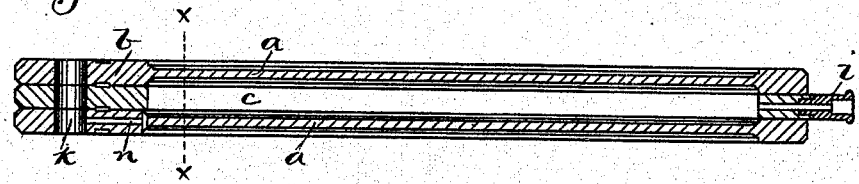
Figure 3:
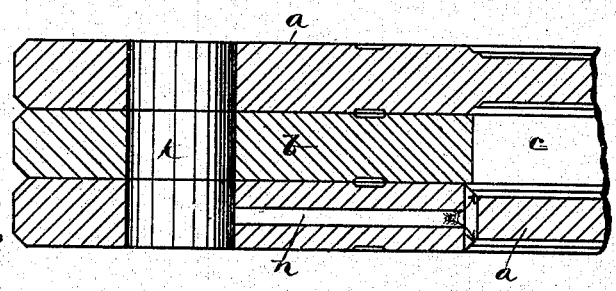
Figure 4:
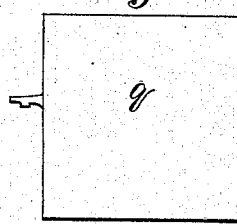
Figure 5:

Figure 1 is a side elevation, parts of the supporting-frame being broken away. Fig. 2 is an enlarged section through two of the plates and the intervening frame; Fig. 3, an enlarged section broken on the line $xx$ of Fig. 2. Fig. 4 is a detached detail side elevation of the blank plate for decreasing the capacity of the press. Fig. 5 is a cross-sectional view of said plate.

For the purposes of describing said process reference will be made to a well-known constructural feature of the filter-press, which mainly consists of a series of plates $a$, between every two of which is a frame $b$, which forms an intervening chamber $c$. These frames and plates have arms $d$ and $d'$, that project over horizontal bars $e$ and are supported therein between the stationary tail-block $f$ and the head-block $g$, that is adapted to be moved by a screw $h$ to bring the plates in rigid contact with each other or to permit of their attachment for the purpose of removing the cakes of matter that have been formed therein. Each of the chambers $c$ has a drain-cock $i$, that projects over a trough $j$, into which the liquid that has been separated from the solids empties. In order that any less number than the whole of said plates and frames may be used when desired, I provide a blank plate $q$, that may be interposed between any of the operative plates, whereby any communication to the plates that are cut off by said blank plate is avoided. The general outline of the blank plate is substantially the same as that of the operative plates $a$; but said blank plate differs from the plates $a$ by being solid and devoid of any openings to continue or form part of the conduit $k$ beyond the point where it (the said blank plate) is inserted in the press. The object of this blank plate is to afford means for utilizing any less number of plates and frames than the entire number, which is accomplished by inserting the blank plate at any desirable point between the head and tail blocks. When the plates and intervening frames are placed together, as shown in the drawings, there is a continuous channel or conduit $k$ extending approximately the entire length of the press, at the inner end of which is placed a drain cock and valve $k'$, the stem of which penetrates the head-block.

$m$ is an induction-pipe that penetrates the tail-block and communicates with the conduit $k$. The common function of this conduit and inlet-pipe in filter-presses is to inject liquid washes, which find their way through ports $n$, to the interior of the filter-press, as indicated by the arrows in Fig. 3. When washes are used, any outlet through the drain-cocks in the lower portion of the chambers is shut off and the outlet for the washes is through a cock $o$.

I will now describe the apparatus in connection with the process of absorbing the residue of moisture that is left in the cakes of material that have been formed in the chambers after the operation of filtration. The drain cocks and outlets are all closed with the exception of the valve $p$, through which the air may escape. The air is then introduced under requisite pressure to the conduit $k$ through the induction-pipe $m$. The air passes through the channel $n$, heretofore referred to, and, as indicated by the arrows in Fig. 3, thoroughly permeates the cakes of matter and passes out through the cock $p$. The cakes or solids thus subjected to absorbing influences of air have been found to be practically free from moisture, rendering any further drying process by means of heat or otherwise unnecessary.

I claim—

In a filter press, the combination with a series of filter plates having frames interposed between them, and openings forming a continuous conduit extending approximately the entire length of the press, of a blank plate adapted to be placed between said plates and frames whereby the number of said plates to be used, may be limited as desired, and a drainage valve tapping the end of the conduit opposite the induction end, substantially as described.

In testimony whereof I have hereunto set my hand this 15th day of May, 1895.

FRANK A. McKEONE.

Witnesses:
W. W. SMITH,
R. J. McCARTY.